United States Patent
Cannon et al.

(10) Patent No.: US 7,254,188 B2
(45) Date of Patent: Aug. 7, 2007

(54) METHOD AND SYSTEM FOR MODULATING AND DETECTING HIGH DATARATE SYMBOL COMMUNICATIONS

(75) Inventors: Richard Hollingsworth Cannon, Mesa, AZ (US); Richard Macmillan Miller, Gilbert, AZ (US)

(73) Assignee: Comtech EF Data, Tempe, AZ (US)

( * ) Notice: Subject to any disclaimer, the term of this patent is extended or adjusted under 35 U.S.C. 154(b) by 721 days.

(21) Appl. No.: 10/737,323

(22) Filed: Dec. 16, 2003

(65) Prior Publication Data

US 2005/0129147 A1    Jun. 16, 2005

(51) Int. Cl.
*H04L 27/14* (2006.01)
(52) U.S. Cl. .................. 375/324; 714/786
(58) Field of Classification Search ............ 375/324, 375/326, 233, 340, 304, 350; 714/786
See application file for complete search history.

(56) References Cited

U.S. PATENT DOCUMENTS

| 5,504,453 | A | * | 4/1996 | MacDonald et al. ........ 329/304 |
| 5,872,815 | A | * | 2/1999 | Strolle et al. ............... 375/321 |
| 7,031,405 | B1 | * | 4/2006 | Touzni et al. ............... 375/326 |

* cited by examiner

*Primary Examiner*—Mohammed Ghayour
*Assistant Examiner*—Lawrence Williams
(74) *Attorney, Agent, or Firm*—Jeffrey D. Moy; Weiss & Moy, P.C.

(57) ABSTRACT

A method and system for modulating and detecting high datarate symbol communications provides superior performance in channels having a fixed spectral efficiency. A quadrature amplitude modulation (QAM) constellation and an optimized mapping are employed to encode/detect a communications signal and error correction is provided using high speed forward error correction techniques. A log likelihood detection scheme and/or a novel phase detector may be employed to further enhance performance.

25 Claims, 8 Drawing Sheets

METHOD AND SYSTEM FOR MODULATING AND DETECTING HIGH DATARATE SYMBOL COMMUNICATIONS

BACKGROUND OF THE INVENTION

1. Field of the Invention

The present invention relates generally to communications systems, and more specifically, to a digital satellite communications modulation and detection scheme for multiple-carrier link operation.

2. Background of the Invention

Digital communication systems are presently prevalent in both voice and data communications equipment. One such application is in satellite data link communications equipment, where minimum spectral efficiencies are required for uplink/downlink equipment designed to meet specific standards. In order to meet high datarate requirements on a band-limited channel such as a satellite connection, a minimum spectral efficiency must be met in conjunction with a low symbol error probability requirement. The symbol error probability is dictated by the energy per transmitted bit versus the noise spectral density ($E_{bt}/N_o$). System requirements for gain and noise level that determine $E_{bt}/N_o$ are dictated by maintaining minimum energy and maximum noise levels at each link in the communications chain.

The modulation schemes employed in the above-described communications systems have typically been quadrature amplitude modulation (QAM) or quadrature phase-shift keying (QPSK), providing a band-limited signal with a high spectral efficiency. Each phase state (for QPSK) or amplitude-phase state (for QAM) is mapped to a particular value for an interval in the signal (often referred to as a "chip"). The particular phase/amplitude states used to represent information collectively form a "constellation", which is so-called because of the shape defined by a phase-amplitude diagram of the particular modulation states. Selection of the constellation and mapping of multiple chip sequences to symbols provides for rejection of disallowed combinations or sequences, lowering the symbol error probability of the link by increasing the effective $E_{bt}/N_o$.

For satellite systems that operate the output amplifiers near saturation, as in a single-carrier system, phase-shift-keying (PSK) has traditionally been a modulation of choice, as PSK detection is not degraded for amplitude compression of the signals due to non-linearity introduced in a high power amplifier (HPA). However, in multi-band satellite links, where multiple carriers carry multiple data streams, non-linear operation of the HPA is avoided, as signal amplitude distortion and inter-channel interference is introduced by any non-linearity in the link.

Selection of a symbol rate with respect to a known bandwidth generally dictates a spectral efficiency and traditionally a particular modulation type. However, for PSK, as the number of states per chip are increased by increasing modulation order, the ability to distinguish between states decreases and the ability to determine a unique carrier phase reference without cycle slip deteriorates. A transition from QPSK, which provides a maximum spectral efficiency of 2 bits/s/Hz to a system in which a 3 bit/s/Hz requirement may be met, requires (for PSK) an 8 state system known as 8PSK.

Therefore, it would be desirable to provide a communications link providing a spectral efficiency of 3 bits/s/Hz that outperforms 8PSK so that improved link performance is obtained. It would further be desirable to improve carrier detection performance for a selected constellation.

SUMMARY OF THE INVENTION

The above stated objectives are achieved in a method and communications system for modulating and detecting data on a satellite communications channel. A novel combination of quadrature amplitude modulation using a predetermined constellation, and an optimized log-likelihood mapping scheme for detecting points of the predetermined constellation provides optimized bit error rate (BER) performance at 3 bits/s/Hz.

The constellation has point values with two points of differing amplitude and having a zero reference phase, and two other points having corresponding amplitude to the first two points with a 180 degree reference phase. The remaining four points are located symmetrically above and below the lower amplitude points of the zero reference phase and 180 degree reference phase set. The points may have complex locations substantially equal to (K/2,0), (3K/2,0), (K/2,K), (−K/2,K), (−K/2,0), (−3K/2,0), (−K/2,−K) and (K/2,K), where K is an arbitrary amplitude reference and further including all phase rotations of the constellation.

The mapping is performed in groupings, with three groupings one associated with each bit of a 3-bit symbol. Each grouping includes four points in a subgroup associated with a logical "0" for the associated bit and four points in another subgroup associated with a logical "1" and each grouping has two points in common with the other groupings. A unique point is thus selected by the intersection of the subgroups determined by an input 3-bit symbol value.

Finally, a log-likelihood metric is applied to the detector mapping, so that subgroup membership is determined for each grouping (symbol bit) in a non-linear fashion. The log-likelihood outputs are provided to a codec, which may be a turbo product decoder, or low density parity check decoder providing forward error correction.

A novel carrier phase detector for extracting a coherent demodulation reference may be used within the above-described system to further enhance system performance. The carrier phase detector uses amplitude information of received constellation points to selectively include only zero and 180 degree phase reference received points in the carrier phase detector output.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention includes methods and systems for communicating digital data at fixed spectral efficiencies, in particular a standardized spectral efficiency of 3 bits/second/Hz as well as a receiver apparatus embodying the methods of the present invention. Generally, the fixed spectral efficiency channels alluded to above are dictated in satellite communications channels and the techniques of the present invention are particularly applicable to digital satellite communications. However, the techniques embodied herein may be applied to other forms of communication and the present invention should be understood to the use of the techniques described herein as applied to other communications systems.

Highly efficient forward error correction (FEC) techniques have been developed and incorporated into communications systems that decrease the output symbol error rate by correcting errors and therefore effectively increasing $E_b/N_o$. High-speed FEC codes known as Turbo Product Codes (TPCs) and Low Density Parity Check (LDPCs) codes are employed in satellite communication systems (as well as in other communication systems) that provide low BER with low computational overhead. In the past, the efficiency of a data communications channel employing FECs was largely dictated by the FEC scheme employed, but with highly efficient FEC codes, the modulation scheme becomes a determining factor in the overall spectral efficiency. The present invention provides a modulation and mapping scheme, as well as a detector that advantageously uses the features of the modulation and mapping scheme to improve the performance of a communications channel.

Figure 1:
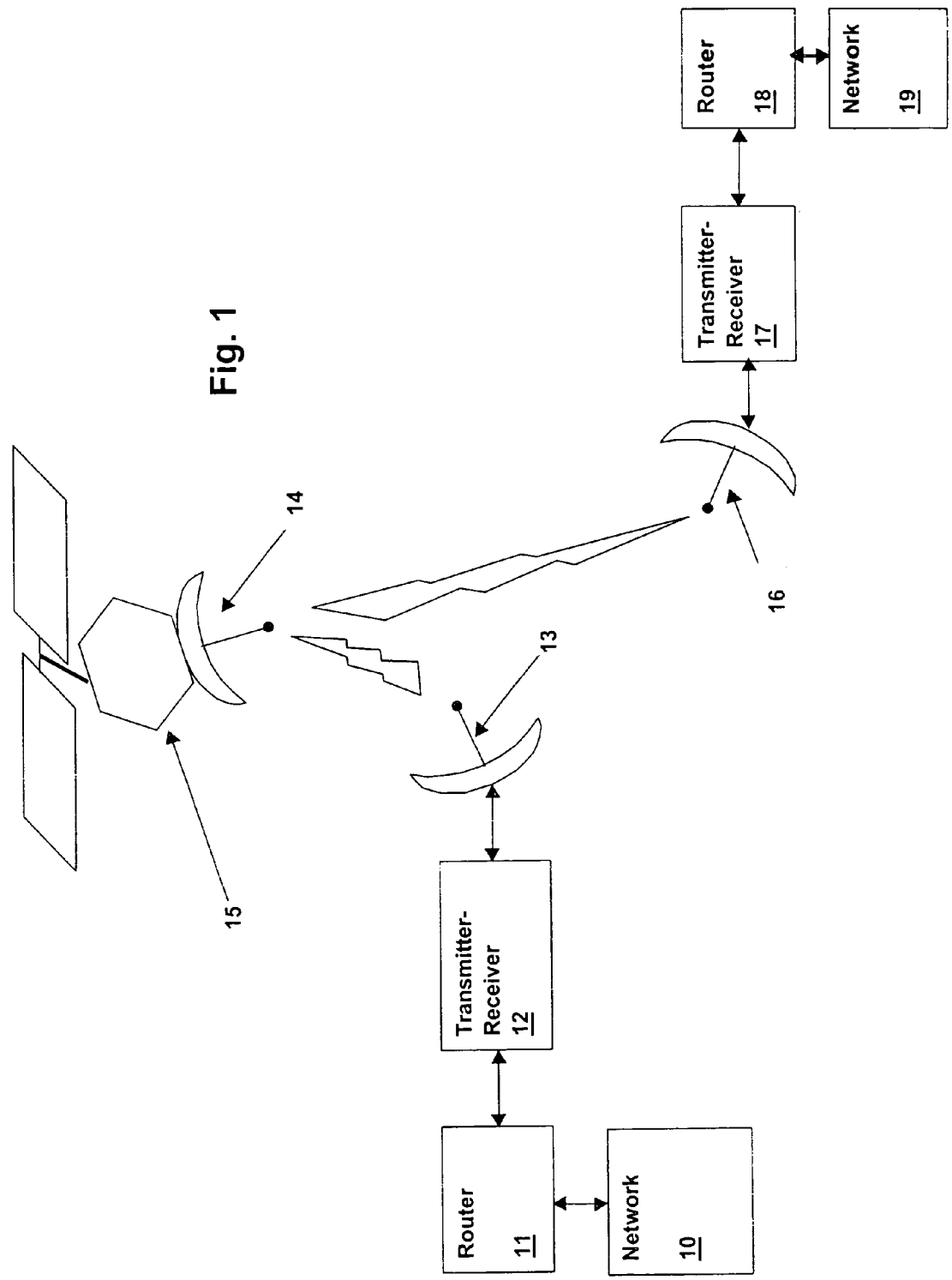
FIG. 1 is a block diagram depicting a satellite network communications system in accordance with an embodiment of the present invention.

Referring now to the figures and in particular to FIG. 1, a satellite network communications channel within which the present invention may be embodied is depicted in a block diagram. A first uplink/downlink includes a router 11, a transmitter-receiver 12 and an antenna 13. Router 11 is coupled to a network 10 that exchanges packets with the first uplink/downlink. In the context of the present invention, packets indicate time-division multiplex (TDM) data as well as packets for data communications such as Internet protocol (IP) packets. The present invention is not dependent on a particular data format and may be applied to continuous data streams as well. A satellite 15 contains a transmitter-receiver, transponder or other suitable circuitry for receiving and transmitting information using an antenna 14. The configuration of a separate transmitter-receiver 12 and router 11 is an illustrative configuration. Packets transmitted via first uplink/downlink to satellite 15 may be forwarded to a second uplink/downlink that includes a router 18, a transmitter-receiver 17 and an antenna 16. Router 18 is coupled to a network 19 which can interchange packets with the second uplink/downlink. Other configurations such as other types of non-network digital communications systems will include data connection blocks other than routers 11, 18 and network connections 10, 19, such as data multiplexers for digital telephony or digital switches with analog front-ends for analog telephone switch satellite connections. Other digital communication configurations such as radio are contemplated by the present invention and represent additional embodiments thereof.

While the illustrative embodiment is directed to communications channels involving a satellite uplink/downlink it will be understood by those of ordinary skill in the art that the present invention may be used with other communications channels, and that the advantages of the present invention are particularly applicable to those communications channels that have fixed spectral efficiency requirements dictated by fixed channel bandwidth and bit error rate (BER).

The present invention provides a spectral efficiency of 3 bits/sec/Hz at lowered power levels commensurate with new coding techniques such as Turbo Product codes and Low Density Parity Check Codes. A need for a 3 bit per symbol (8 point) modulation scheme that is more robust than conventional 8PSK at low $E_b/N_O$ has been identified, since error correction coding has improved to the point that it is now necessary not only to look at the bit error rate versus $E_b/N_O$ of a system, it is also necessary to find a scheme which can be robustly demodulated at the $E_b/N_O$ target for a selected forward error correction (FEC) scheme.

Figure 2:
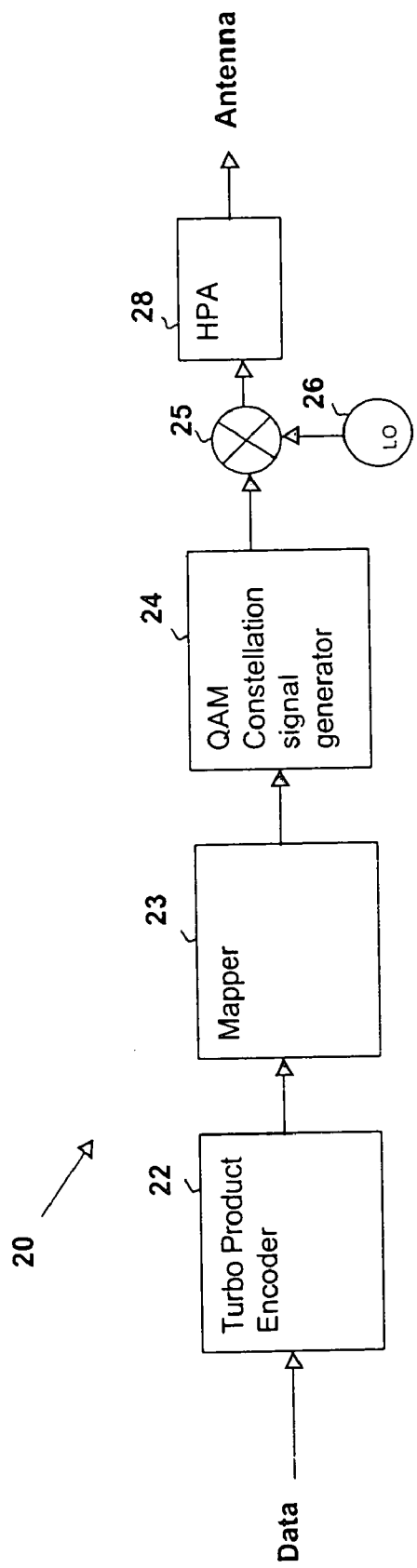
FIG. 2 is a block diagram of a transmitter in accordance with an embodiment of the present invention.

Referring now to FIG. 2, a block diagram of a transmission/modulation system in accordance with an embodiment of the present invention is depicted. Data is provided to an FEC circuit, in the present embodiment a TPC encoder 22, which is generally an encoder integrated circuit or programmable array having an FEC circuit embodied therein. Turbo product codes are well known in the art as FEC codes that provide improvements over more traditional one-dimensional coding. In accordance with alternative embodiments of the present invention, the various blocks providing for encoding and decoding of turbo product codes may be replaced with low density parity check (LDPC) encoders and decoders that provide for use of LDPC coding. In general, it is not the particular type of FEC coding that the present invention concerns as much as it is the fact that an FEC corrected channel as available today dictates a maximum BER that must be maintained over the range of $E_b/NO$ that may be encountered in the system and that the modulation scheme can provide improved BER for wider ranges of $E_b/NO$ than may be provided by 8PSK. Therefore, other types of FEC coding that generate such requirement may find benefit from the application of the constellation and mapping techniques of the present invention, as well as the detection metrics and carrier phase detector employed in the disclosed embodiments of the present invention.

TPC is a technique that uses conventional block codes such as Hamming or Parity codes in multiple dimensions, and uses iterative decoding with a Soft Input Soft Output or SISO decoding engine to achieve excellent coding gain. U.S. Pat. No. 6,526,538 discloses TPC techniques and is incorporated herein by reference.

TPC coding techniques are particularly advantageous for code rates N/K approaching 1 (N represents the data length of a block and K is the symbol or code length), where not much additional parity is transmitted. The use of Turbo Product Coding in the present invention provides excellent performance in a communications system, replacing a more conventional modulation scheme in order to achieve greater spectral efficiency and a lower transmission power requirement for a given error rate. LDPC codes provide similar advantages.

The FEC encoded output of turbo product encoder 22 is provided to a mapper 23, that is generally a memory-based lookup table providing mappings from 3-bit code outputs of turbo product encoder to detection probabilities for points on a QAM constellation implemented by QAM constellation signal generator 24. The constellation provided by QAM constellation signal generator 24 is a particular constellation and rotations thereof that produce an optimum result in combination with the mapping techniques of the present invention. The mappings provided by mapper 23 and the constellation employed in QAM generator 24 will be discussed in detail below with respect to FIGS. 5 and 6. The output of QAM generator is provided to a mixer 25 that upconverts the QAM generator output via local oscillator (LO) 26 and the output of mixer 25 is provided to high power amplifier (HPA) 28 for producing a signal provided to an antenna, such as antennas 16 and 13 of FIG. 1. In particular, the constellation used in the present invention provides detection advantages for signals processed in an HPA that is operated in the linear region, such as in multichannel satellite communication systems, where power may only be allocated only for active channels and where interchannel interference requirements dictate that the HPA is operated below non-linear regions nearing saturation of the HPA.

Figure 3:
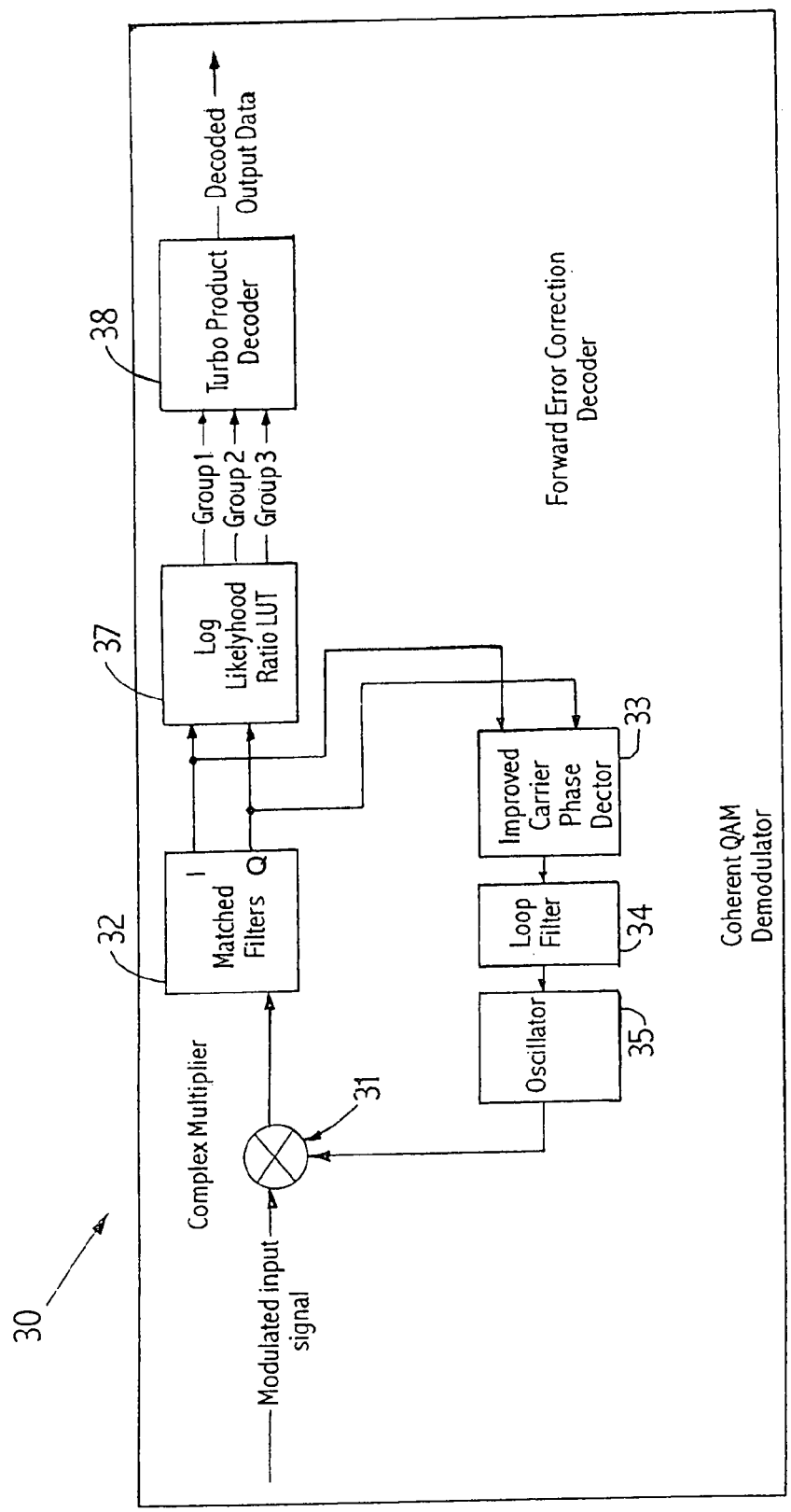
FIG. 3 is a block diagram of a receiver/demodulator in accordance with an embodiment of the present invention.

Referring now to FIG. 3, a block diagram of a receiver/demodulator in accordance with an embodiment of the present invention is shown below. An input signal comprising bit frames having modulation phase and amplitude set by the constellation points is provided to a complex multiplier 31. Complex multiplier 31 demodulates the input signal in conformity with the output of an oscillator 35 having a phase and amplitude locked by a phase-lock loop implemented by a carrier phase detector 33 a loop filter 34 in combination with the oscillator and signal path to phase detector 33.

The output of complex multiplier 31 is coupled to a set of matched filters 32 that extract quadrature (I,Q) channel outputs from the demodulated output signal of mixer 31 and provide them to carrier phase detector 33 and a look-up table 37. In practice, matched filters 32 are digital implementations and include either A/D converters for accepting an output of mixer 31 or mixer 31 itself is a digital complex multiplier operating on a digital representation of a sampled input signal. Look-up table performs a detection operation on the (I,Q) signals, providing three bit detection probability outputs to turbo product decoder 38, which provides the final decoded output data. Look-up table 37 provides novel functions within the receiver of the present invention, converting the (I,Q) inputs to a series of coefficients for providing codec inputs to TPC decoder 38. The coefficients are determined by a log-likelihood mapping of equal probability curves associating I and Q amplitude values with three groupings of points of the QAM constellation employed in modulation scheme of the present invention.

Prior demodulation schemes typically have not employed decoding of the above-described type, as PSK modulation schemes do not typically benefit from such mappings and prior QAM schemes are not advantaged sufficiently by a non-linear detection mechanism so as to justify the cost of look-up table 37. For example, the depicted embodiment may employ a look-up table having 16 probability levels (4 bits) for each of the 3 grouping decodes. The I,Q input values may be 8 bits each, requiring a 64 Kbyte 12-bit memory that has an access time appropriate to the data rate of the system, which is generally prohibitive. Folding techniques may be used to reduce the memory size required by taking advantages of symmetry in the mapping functions, but generally a simplified mapping output is provided rather than a log-likelihood mapping contour as used in the present invention. The particular constellation and mappings used in the present invention provide an advantage when mapped by the log-likelihood look-up table 37, so that the cost of the above-described memory is justified by an increase in $E_{b}/N_O$ on the order of 0.4 dB.

Figure 4:
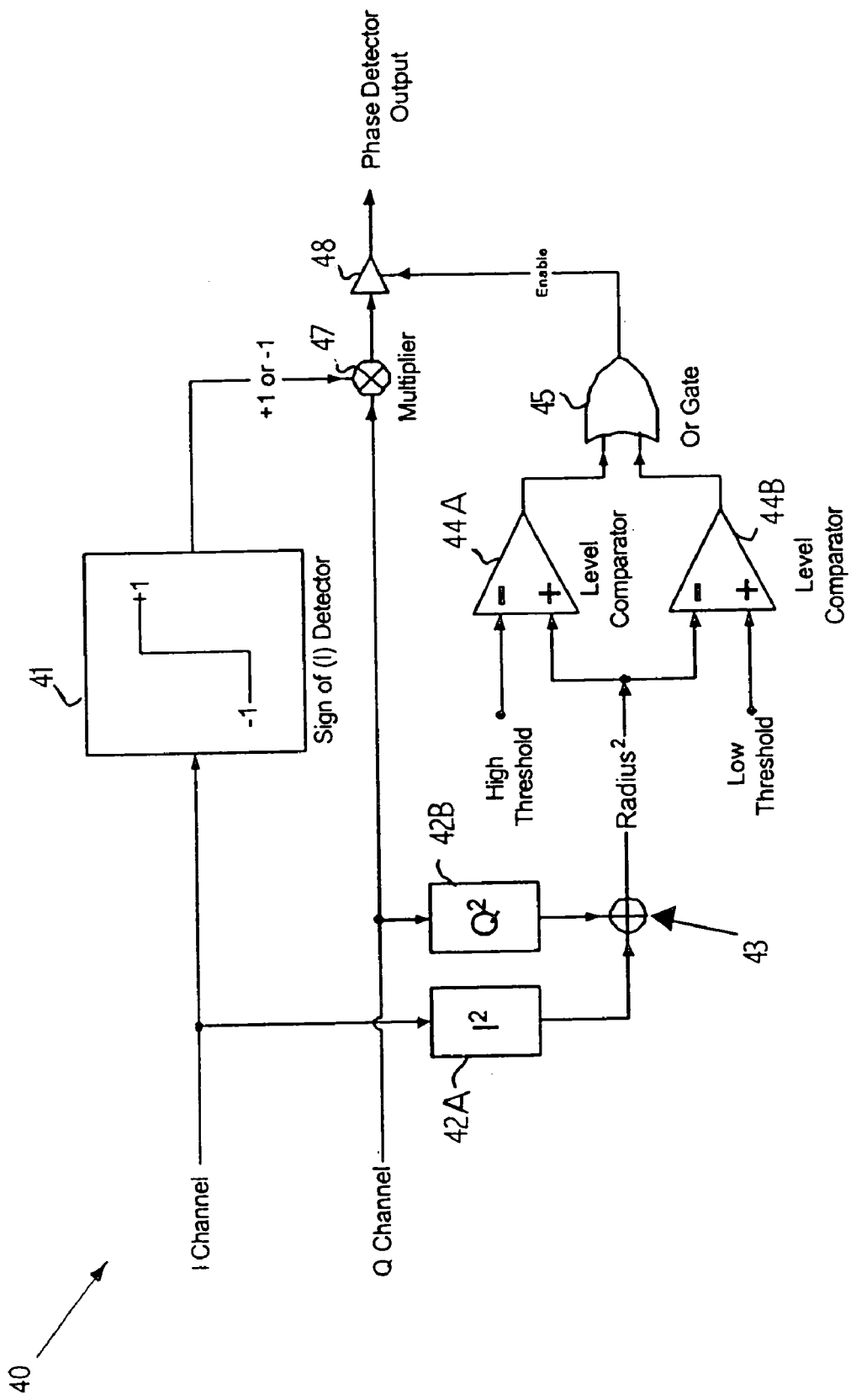
FIG. 4 is a block diagram of a carrier phase detector in accordance with an embodiment of the present invention.

The present invention also uses the constellation used in the method and systems of the present invention advantageously by incorporating a carrier detector in accordance with another embodiment of the present invention. Referring now to FIG. 4, a carrier phase detector 40 in accordance with an embodiment of the invention is shown that may be used as carrier phase detector 33 of FIG. 3. I and Q channel inputs from matched filters 32 are provided to squaring functions 42A and 42B and outputs of squaring functions 42A and 42B are summed by summation 43 to provide a measure of the complex amplitude of the received signal (signal radius). The input signal radius is detected by a pair of comparators 44A and 44B having outputs combined by OR gate 45. The OR gate 45 output enables an output of carrier phase detector 40 so that only when the signal radius exceeds the window established by the low and high threshold reference inputs of comparators 44A and 44B, is the phase-lock detector output applied to an attached loop filter. Computing the radius exactly would require a "square root" operation, which is a complex calculation. It is relatively less complex to square the I and Q inputs and add them. The resulting sum is equal to the square of the radius, but by adjusting the High and Low amplitude detection threshold values to compensate yields the desired result of classifying the constellation points into amplitude sets.

The low threshold is set between the level corresponding to the radius of the inner 2 points (normalized as radius 1) and the level of the radius of the 4 points with normalized radius of 2.24. This gives a normalized threshold value of about $1.6^2$. The high threshold is set between the level of the 4 points with normalized radius of 2.24 and the outmost 2 points with normalized radius of 3, with a value of about $2.6^2$. The level comparators and the logical OR gate generate an enable signal to turn the output of the detector on or off. The detector is on if the square of the radius is lower than the low threshold or higher than the high threshold.

The low and high threshold reference inputs of comparators 44A and 44B are set so that the lowest amplitude and highest amplitude points contribute to (and are thereby correlated by) phase detector 40 output, and a property of the constellation employed in the present invention as described below is that the lowest and highest amplitude points have the same or 180 degree phase relationship to each other, whereas the points having amplitudes within the window effectively excluded by comparators 44A and 44B are points having a differing phase. The sign of the phase of the points admitted to the phase detector is corrected by a multiplier 47 that multiplies the Q channel input to phase detector 40 by a sign derived from the I channel input via a sign detector (comparator) 41. The use of the Q channel provides a lock with respect to the reference phase aligned with the I channel, as is well known in the art. As the phase of the received signal deviates from the I channel aligned phase, the amplitude of the Q channel signal increases, thus increasing the level applied to phase detector 40 output for signals above or below the window of exclusion provided by comparators 44A and 44B. The sign of the I channel controlling the application of Q or −Q to the output of phase detector 40 provides the proper polarity so that the loop filter will pull-in the oscillator and lock the phase-lock loop.

Since the snowflake constellation is rotationally symmetric over $\pi$ radians as opposed to, for example, $\pi/4$ radians for 8 PSK (8 point phase shift-key modulation), the achievable lock stability is greater. The radial amplitude is independent of rotation of the constellation, so the set to which a given constellation point belongs can be determined even when the constellation is rotating (before the carrier loop is locked). The 2 inner and outer points fall on the x-axis when the constellation is locked, and they will therefore be correctly stabilized by a $\pi$ symmetric detector as described above. An alternative to the above-described phase detector is an I*Q detector, but the described detector that computes Q*sign (I), has greater linear phase range at high $E_b/N_O$ and can be implemented using with a simplified inverse circuit rather than full hardware multiply.

At the target operating point, the carrier phase detector of the present invention retains roughly ½ of its original gain while an 8PSK detector loses 90% of its original gain. The result is performance improvements with respect to cycle skipping. Cycle skip performance is a non-linear phenomenon and is very difficult to quantify. A rough approximation to the difference between using an 8PSK detector and a BPSK detector is that the order of the non-linearity necessary to operate an 8PSK detector is 8 vs. 2. There is approximately a 3 dB signal to noise penalty for each factor of 2 of non-linearity that must be introduced. Therefore, the selected snowflake constellation, when received using the phase detector of the present invention, can be tracked roughly 6 dB below the point where an 8PSK detector will fail. The phase detector described above substantially extends the range of utility for modulation at 3 bits/sec/Hz.

Figure 5B:
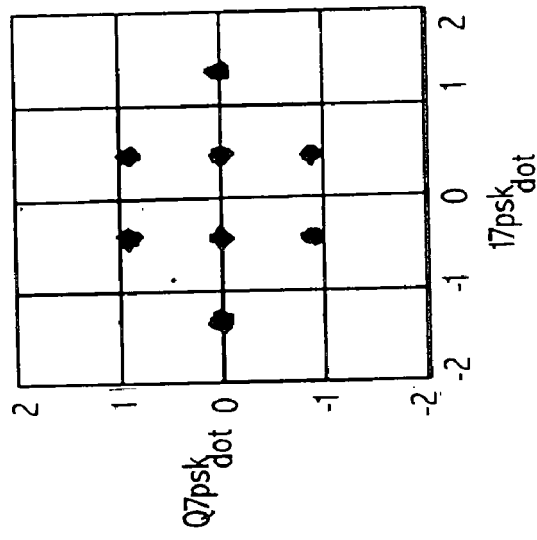
FIGS. 5A and 5B are constellation diagrams for illustrating the constellation employed in the present invention.
Figure 5A:
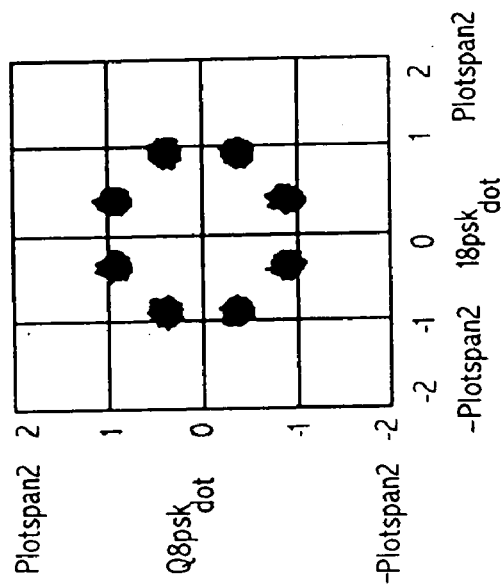

Referring now to FIGS. 5A and 5B, the constellation employed in the present invention is contrasted with an 8PSK constellation, by way of illustration. FIG. 5A depicts an 8PSK constellation resembling a circle, where the radial position of the points shown in the diagram represents the amplitude of a signal frame and the angular position represents the phase. All points have equal amplitude and the phase of the points are distributed at 45 degree increments around the circle. FIG. 5B depicts the QAM constellation employed in embodiments of the present invention, resembling a snowflake. Four points are located along the zero/180 degree phase axis and represent the points permitted to affect carrier phase detector 40 outputs as described above. Note that the amplitude of the non-zero phase points is in between the amplitudes of the inner points and outer points of the zero/180 degree points. The non-zero phase points are excluded from the phase detector 40 output by comparators 42A and 42B. Thus, the carrier phase detector of the present invention uses the amplitude information embedded in the constellation of FIG. 5A to improve carrier tracking. The constellation provides further improvement in detection in combination with a mapping of points as will be described below.

The Snowflake constellation may be described as 8 points on an equally spaced rectangular grid such that 4 points are in a horizontal line. To these are added 2 pairs of additional points equally spaced above and below the center 2 points in the horizontal line. Although we define this constellation (and subsequent mappings, metrics and phase detector) in terms of horizontal and vertical spacing, the performance is independent of any fixed rotation, and therefore rotations of the constellation represent equivalent modulation schemes. The depicted rotation includes the points having complex locations substantially equal to (K/2,0), (3K/2,0), (K/2,K), (−K/2,K), (−K/2,0), (−3K/2,0), (−K/2,−K) and (K/2,K), where K is an arbitrary amplitude reference representing the spacing between the points on the I axis (horizontal axis) of the constellation diagram. Variations from the set of points described above will tend to reduce performance, but there may be advantages in reducing the amplitudes of the (+/− 3K/2,0) points to reduce the peak power level, and it should be understood that minor variations in the phase or amplitude of the points are equivalent values contemplated by the present invention.

Referring now to FIGS. 6A-6D, a mapping for the constellation shown in FIG. 5B is illustrated. Mapping is the process of coding the 3 bits represented by the constellation signal frames into 1 of the 8 constellation points. There are 8! or 40,320 possible combinations of the 8 points. Gray coding where possible is generally a preferred starting point for determining a mapping. The mapping is selected to minimize the total possible number of bit errors as a function of symbol errors. Within the 40,320 possible mappings mentioned above, 48 have optimal BER properties. The optimum mappings are determined by analyzing the bit error possibilities for a given symbol error rate, when coding 3 bits into 1 of 8 points, as will be described below.

Figure 6B:
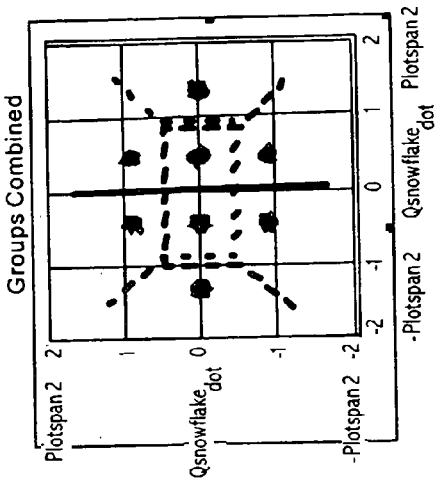
FIGS. 6A-6D are constellation diagrams for illustrating the mappings used in the present invention.
Figure 6D:
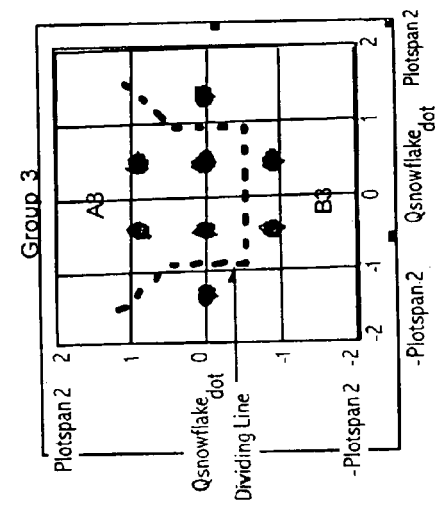
Figure 6A:
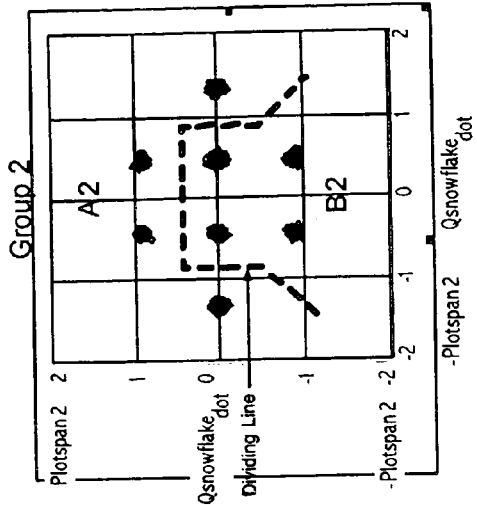
Figure 6C:
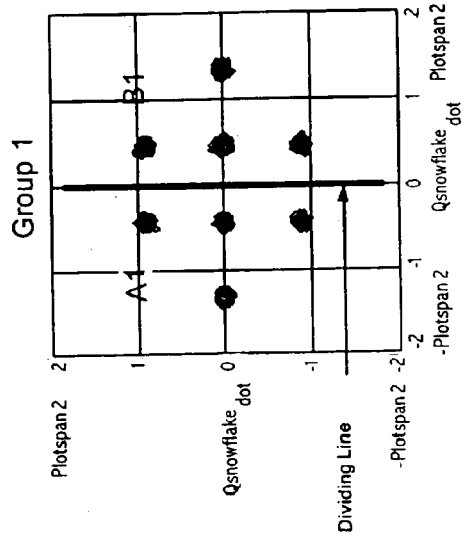

The mapping of the present invention as embodied in look-up table 37 of FIG. 3 and mapper 23 of FIG. 2, is performed by dividing the eight points into three groupings, one associated with each encoded bit. Each grouping has two subgroups of four points, one subgroup associated with a logical "1" value for the associated bit, and another subgroup associated with a logical "0" value for the associated bit. Each of FIGS. 6A-6C represent one of the groupings, and FIG. 6D shows a map of all of the groupings and all dividing lines distinguishing the groupings. Grouping 1 depicted in FIG. 6A maps a first logical value for the associated bit to the points on the left half-plane of the diagram and the other logical value to the points on the right half-plane. Grouping 2 depicted in FIG. 6B maps the four lower center points to a first logical value and the other points to the other logical value. Grouping 3 depicted in FIG. 6C maps the four upper center points to a first logical value and the other points to the other logical value. Thus three bits are represented by the constellation and a unique combination of the values (a 3-bit word) is determined for each constellation point by virtue of the point's membership in a particular subgroup of each grouping.

Figure 7B:
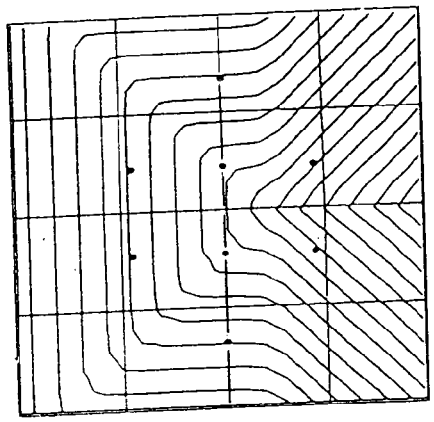
FIGS. 7A-7C are contour plots depicting log likelihood metrics used in the present invention.
Figure 7C:
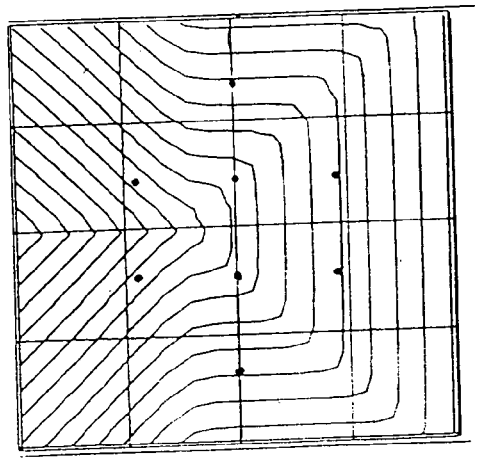
Figure 7A:
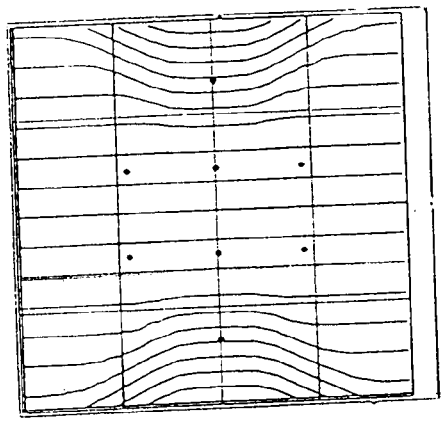

Optimum performance for a recursive coding scheme is achieved by using log-likelihood metrics for decoding. However, as mentioned above, linear metrics have been used in the past, as linear metrics are simple to generate and the memory required for implementing log-likelihood metrics is prohibitive. Referring now to FIGS. 7A-7C, contour plots of log-likelihood metrics for the groupings described above are shown. The plots show optimum receive slicing for Turbo Product Codes with the slicing levels on a per bit basis from the following equation:

$$LLR_{idx} := \ln\left[\frac{\sum_{j=0}^{7} \text{if}\left[Code_j = 1, e^{-\left[\frac{(Idot_j - Itest_{idx})^2 + (Qdot_j - Qtest_{idx})^2}{2\sigma^2}\right]}, 0\right]}{\sum_{j=0}^{7} \text{if}\left[Code_j = 0, e^{-\left[\frac{(Idot_j - Itest_{idx})^2 + (Qdot_j - Qtest_{idx})^2}{2\sigma^2}\right]}, 0\right]}\right]$$

The contours shown in FIG. 7A correspond to the log-likelihood equal probability contours for grouping I of FIG. 6A. The contours shown in FIG. 7B correspond to the log-likelihood equal probability contours for grouping II of FIG. 6B. The contours shown in FIG. 7C correspond to the log-likelihood equal probability contours for grouping III of FIG. 6C. Worthy of note is that while approximations using a linear metric for Grouping I would generally be close enough not to degrade the optimum BER of the system of the present invention, linear metrics used for Grouping II and Grouping III would deviate significantly from the ideal contours of FIGS. 7B and 7C. Therefore, use of the log-likelihood contours included in the method and system of the present invention provides a distinct improvement in conjunction with the constellation and groupings used in the present invention. An implementation of a receiver including the contours of FIGS. 7A-7C may be made by coding these contours into a memory implementing look-up table 37 and addressed by demodulator I and Q outputs to produce a numerical value in conformity with the contour, which is then delivered to the input of the error correction decoder.

In order to evaluate the efficiency of a constellation it is necessary to estimate the constellation's error performance. This is done by observing the effect of adding Gaussian noise to the In Phase (I) and Quadrature (Q) channels of each constellation (horizontal and vertical axis respectively on the plots). Given a regular constellation, the probability of a symbol error (transmitting a given point from the 8 possibilities and receiving a different one due to additive noise) can be computed from the constellation geometry and the Normal Probability distribution. A mathematical variant of the Normal distribution is used, known as the "Q" function. The Q function gives the single sided probability in the "tail" of the Normal probability curve as a function of a given standard deviation. The Symbol error probability curve is determined by computing the equivalent standard deviation for an 8-point constellation, modified by a Geometry Coefficient which is calculated based on the Euclidian distance from a point to the error threshold. The equivalent standard deviation is calculated as a function of the Energy per Transmitted bit to Noise spectral density, or $E_{bt}N0$. The Geometry Coefficient modifies the standard deviation. A larger value of Geometry Coefficient is better, with slight variations being significant as the result is used as an exponent. The equations are as follows:

$$Q\ \text{function}(x) = \frac{1}{\sqrt{2*\pi}} * \int_{x}^{\infty} e^{-\frac{y^2}{2}} * dy$$

Symbol Error Probability=Q($\sqrt{2}*3*E_{bt}/N_o$*Geometry_Coeff)

It is then necessary to compute the bit error probability from the symbol error probability. The bit error probability may be approximated by investigating different "mappings".

For a selected mapping, an average number of bit errors per symbol error can be evaluated, known as a "Mapping Coefficient". The selected snowflake constellation yields a mapping coefficient of 0.9167 and a geometry coefficient of 0.4472, where a typical 8 PSK mapping yields a mapping coefficient of 0.6667 and a geometry coefficient of 0.3827.

The equation for estimated BER is

Estimated BER=Mapping_Coeff*Q($\sqrt{2}*3*EbtN0$*Geometry_Coeff)

Figure 8:
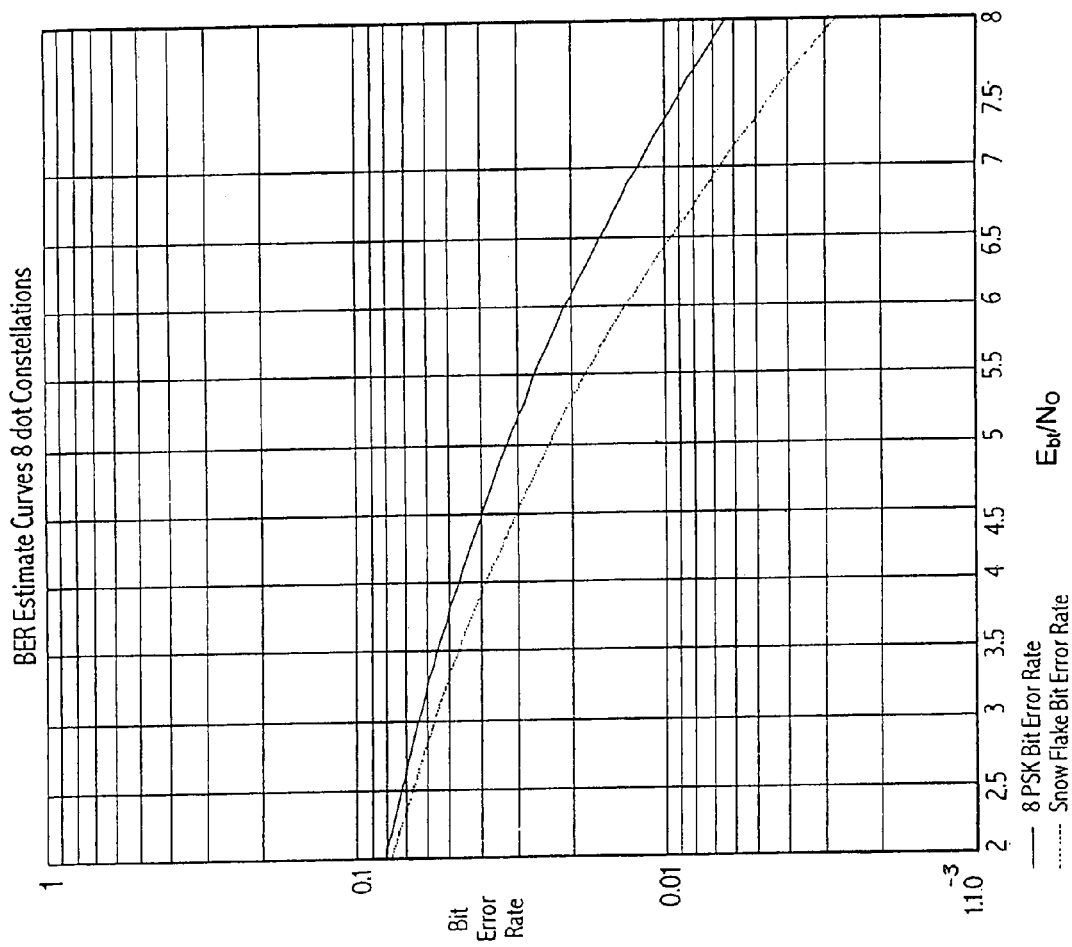
FIG. 8 is a graph depicting BER performance of a system in accordance with an embodiment of the present invention.

The above equation provides a lower bound on the BER, but the actual BER is generally within 0.05 dB of the estimate. "Monte Carlo" simulations were run to confirm the results of the equations. The BER estimate curves for the snowflake constellation using the above-described optimal mapping versus an 8PSK BER estimate are shown in FIG. 8. The snowflake constellation (dotted line) is visibly better than 8PSK (solid line) over a wide range of EbtN0. The results are valid for channels that are average power limited. Some satellite channels are run with the amplifier near saturation and 8PSK may be advantageous in those applications. Much of the satellite market requires a transmission having multiple carriers sharing a transponder and the results presented above are valid for linear amplifier (transponder HPA) operation. Therefore the snowflake constellation provides superior performance in the above described applications.

The combination of the snowflake constellation, mapping for the constellation, the improved carrier phase detector, log-likelihood metrics and TPC encoding and decoding provide a highly spectrum and power efficient data communications link.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A receiver comprising:
   a demodulator for receiving symbol signal frames and producing quadrature demodulated output signals;
   a mapping look-up unit coupled to said demodulator for receiving said quadrature demodulated output signals and determining a three-bit symbol decode associated with points on a predetermined constellation, wherein said constellation has the property of having a first and second point of differing amplitude and zero reference phase, a third point having an amplitude equal to an amplitude of said first point and a 180 degree reference phase, a fourth point having an amplitude equal to an amplitude of said second point and a 180 degree reference phase, fifth and sixth points having real magnitudes substantially equal to said amplitude of said first point and equal imaginary magnitudes of opposite sign, and seventh and eighth points having real magnitudes substantially equal to a negation of said amplitude of said first point and equal imaginary magnitudes of opposite sign, wherein said mapping look-up unit produces probability values for each bit in said three-bit symbol decode from log-likelihood grouping maps for determining membership within a grouping associating said points with values of each bit of said three-bit symbol decode, whereby magnitudes of said quadrature demodulated output signals determine whether or not each symbol signal frame has membership in a first subgroup corresponding to a logical zero or membership in a second subgroup corresponding to a logical one for each grouping; and
   a codec coupled to an output of said mapping lookup unit for receiving said probability values for each bit and determining values of each bit.

2. The receiver of claim 1, wherein said codec comprises a forward error correction block coupled to an output of said mapping look-up unit for receiving said three-bit symbol decode from said mapping look-up unit and providing a corrected data stream in response to a sequence of three-bit symbol decodes.

3. The receiver of claim 2, wherein said forward error correction block is a turbo product decoder.

4. The receiver of claim 2, wherein said forward error correction block is a low density parity check error correction decoder.

5. The receiver of claim 1, wherein said amplitude of said second point is substantially equal to three times said amplitude of said first point.

6. The receiver of claim 5, wherein said first through eighth points of said constellation have complex magnitudes of (K/2,0), (3K/2,0), (K/2, K), (−K/2, K), (−K/2,0), (−3K/2,0), (−K/2, K) and (K/2, K), respectively for a particular rotation of said constellation, where K is an arbitrary coefficient for determining an overall amplitude of said constellation.

7. The receiver of claim 1, wherein said amplitude of said first point is less than three times said amplitude of said second point and greater than the absolute amplitude of said fifth, sixth, seventh and eighth points.

8. The receiver of claim 1, wherein a grouping associated with a first bit of said three-bit symbol decode divides said constellation between a first subgroup including said first, second, fifth and seventh points and a second subgroup comprising all points that are not members of said first subgroup, wherein a grouping associated with a second bit of said three-bit symbol decode divides said constellation between a third subgroup including said first, third, seventh and eighth points and a fourth subgroup comprising all points that are not members of said third subgroup, and wherein a grouping associated with a third bit of said three-bit symbol decode divides said constellation between a fifth subgroup including said first, third, fifth and sixth points and a sixth subgroup comprising all points that are not members of said fifth subgroup, and wherein is said log-likelihood.

9. The receiver of claim 1, further comprising:
an oscillator coupled to said demodulator for providing a carrier reference for demodulating said symbol signal frames; and
a carrier phase detector coupled to said demodulator for receiving said quadrature demodulated signals and providing an output for controlling a phase of said oscillator, and wherein said carrier phase detector is selectively responsive to a subset of said symbol signal frames in conformity with a detected amplitude of said quadrature demodulated signals.

10. The receiver of claim 9, wherein said subset of said symbol signal frames comprises signals corresponding to said first, second, third and fourth members of said constellation.

11. The receiver of claim 10, wherein said carrier phase detector comprises a window comparator for determining whether or not an amplitude of one of said symbol signal frames is outside of a predetermined range, and wherein an output of said phase detector is enabled only when said amplitude of symbol signal frame is outside of said predetermined range.

12. The receiver of claim 10, further comprising:
a pair of squaring units coupled to said quadrature demodulated signals; and
a summing unit for summing outputs of said squaring units and providing an output to an input of said window comparator, whereby said window comparator determines whether a square of said amplitude of said symbol signal frame is outside of said predetermined range.

13. The receiver of claim 1, wherein said mapping look-up unit includes at least one log-likelihood grouping maps for at least one of said groupings and includes at least one linear decision map for at least one other of said groupings.

14. A method for receiving a communications signal bearing three-bit symbol encodes associated with points on a predetermined constellation, wherein said constellation has the property of having a first and second point of differing amplitude and zero reference phase, a third point having an amplitude equal to an amplitude of said first point and a 180 degree reference phase, a fourth point having an amplitude equal to an amplitude of said second point and a 180 degree reference phase, fifth and sixth points having real magnitudes substantially equal to said amplitude of said first point and equal imaginary magnitudes of opposite sign, and seventh and eighth points having real magnitudes substantially equal to a negation of said amplitude of said first point and equal imaginary magnitudes of opposite sign, said method comprising:
demodulating a stream of symbol signal frames and producing quadrature demodulated output signals;
retrieving log-likelihood probability values estimating a likelihood of each symbol signal frame being transmitted as each point of said constellation, each of said probability values retrieved in conformity with values of said quadrature demodulated output signals and for an associated one of said points; and
determining symbols associated with said signal frames in conformity with said probability values.

15. The method of claim 14, wherein said determining determines said symbols in conformity with a forward error correction algorithm.

16. The method of claim 15, wherein said forward error correction algorithm computes turbo product decodes.

17. The method of claim 15, wherein said forward error correction algorithm computes low density parity check decodes.

18. The method of claim 14, further comprising generating a carrier reference signal for performing said demodulating, and wherein said generating generates said carrier reference signal phase-locked with a carrier of said stream of symbol signal frames in response to a phase of some but not all of said points on said predetermined constellation.

19. The method of claim 14, wherein said generating generates in response to said first, second, third and fourth points on said predetermined constellation.

20. A receiver comprising:
a demodulator for receiving symbol signal frames and producing quadrature demodulated output signals;
a mapping look-up unit coupled to said demodulator for receiving said quadrature demodulated output signals and determining a three-bit symbol decode associated with points on a predetermined constellation, wherein said constellation has eight points having complex magnitudes of (K/2,0), (3K/2,0), (K/2, K), (−K/2, K), (−K/2,0), (−3K/2,0), (−K/2, K) and (K/2, K), respectively for a particular rotation of said constellation, where K is an arbitrary coefficient for determining an overall amplitude of said constellation, wherein said mapping look-up unit produces probability values for each bit in said three-bit symbol decode from log-likelihood grouping maps for determining membership within a grouping associating said points with values of each bit of said three-bit symbol decode, whereby magnitudes of said quadrature demodulated output signals determine whether or not each symbol signal frame has membership in a first subgroup corresponding to a logical zero or membership in a second subgroup corresponding to a logical one for each grouping, wherein a grouping associated with a first bit of said three-bit symbol decode divides said constellation between a first subgroup including said first, second, fifth and seventh points and a second subgroup comprising all points that are not members of said first subgroup, wherein a grouping associated with a second bit of said three-bit symbol decode divides said constellation between a third subgroup including said first, third, seventh and eighth points and a fourth subgroup comprising all points that are not members of said third subgroup, and wherein a grouping associated with a third bit of said three-bit symbol decode divides said constellation between a fifth subgroup including said first, third, fifth and sixth points and a sixth subgroup comprising all points that are not members of said fifth subgroup; and a forward error correction block coupled to an output of said mapping look-up unit for receiving said three-bit symbol decode from said mapping look-up unit and providing a corrected data stream in response to a sequence of three-bit symbol decodes.

21. The receiver of claim 20, further comprising:

an oscillator coupled to said demodulator for providing a carrier reference for demodulating said symbol signal frames; and a carrier phase detector coupled to said demodulator for receiving said quadrature demodulated signals and providing an output for controlling a phase of said oscillator, and wherein said carrier phase detector comprises a window comparator for enabling an output of said carrier phase detector selectively only in response to signal frames corresponding to said first, second, third and fourth points of said constellation in conformity with a detected amplitude of said quadrature demodulated signals.

22. A carrier generation circuit for providing a reference signal for demodulating a received sequence of symbol frames decoded as quadrature demodulated signals, said circuit comprising:

an oscillator having an output for providing said reference signal and an control input for receiving a phase error signal;

a switching circuit having an output coupled to said control input of said oscillator for selectively applying an input phase error signal in response to a switch control input signal;

a phase error magnitude circuit having inputs coupled to said quadrature demodulated signals for generating said input phase error signal and an output coupled to said switching circuit; and an amplitude detector having inputs coupled to said quadrature demodulated signals and an output coupled to said switch control input signal, whereby a phase of said oscillator is controlled in conformity with a subset of said symbol signal frames in conformity with a detected amplitude of said quadrature demodulated signals.

23. The circuit of claim 22, wherein said amplitude detector comprises a window comparator for determining whether or not an amplitude of one of said symbol signal frames is outside of a predetermined range, and wherein said switching circuit is enabled only when said amplitude of symbol signal frame is outside of said predetermined range.

24. The circuit of claim 23, wherein said amplitude detector further comprises:

a pair of squaring units coupled to said quadrature demodulated signals; and a summing unit for summing outputs of said squaring units and providing an output to an input of said window comparator, whereby said window comparator determines whether a square of said amplitude of said symbol signal frame is outside of said predetermined range.

25. The circuit of claim 22, wherein said phase error magnitude circuit produces said phase error signal in proportion to a first one of said quadrature demodulated signals multiplied by a sign of a second one of said quadrature demodulated signals.

* * * * *

UNITED STATES PATENT AND TRADEMARK OFFICE
CERTIFICATE OF CORRECTION

PATENT NO. : 7,254,188 B2
APPLICATION NO. : 10/737323
DATED : August 7, 2007
INVENTOR(S) : Cannon et al.

It is certified that error appears in the above-identified patent and that said Letters Patent is hereby corrected as shown below:

Please replace the paragraph beginning at col. 2, line 11 with the following paragraph:

The constellation has point values with two points of differing amplitude and having a zero reference phase, and two other points having corresponding amplitude to the first two points with a 180 degree reference phase. The remaining four points are located symmetrically above and below the lower amplitude points of the zero reference phase and 180 degree reference phase set. The points may have complex locations substantially equal to (K/2,0), (3K/2,0), (K/2,K), (–K/2,K), (–K/2,0), (–3K/2,0), (–K/2,–K) and (K/2,–K), where K is an arbitrary amplitude reference and further including all phase rotations of the constellation.

Please replace the paragraph beginning at col. 7, line 44 with the following paragraph:

The Snowflake constellation may be described as 8 points on an equally spaced rectangular grid such that 4 points are in a horizontal line. To these are added 2 pairs of additional points equally spaced above and below the center 2 points in the horizontal line. Although we define this constellation (and subsequent mappings, metrics and phase detector) in terms of horizontal and vertical spacing, the performance is independent of any fixed rotation, and

UNITED STATES PATENT AND TRADEMARK OFFICE
CERTIFICATE OF CORRECTION

PATENT NO. : 7,254,188 B2
APPLICATION NO. : 10/737323
DATED : August 7, 2007
INVENTOR(S) : Cannon et al.

It is certified that error appears in the above-identified patent and that said Letters Patent is hereby corrected as shown below:

therefore rotations of the constellation represent equivalent modulation schemes. The depicted rotation includes the points having complex locations substantially equal to (K/2,0), (3K/2,0), (K/2,K), (–K/2,K), (–K/2,0), (–3K/2,0), (–K/2,–K) and (K/2,–K), where K is an arbitrary amplitude reference representing the spacing between the points on the I axis (horizontal axis) of the constellation diagram. Variations from the set of points described above will tend to reduce performance, but there may be advantages in reducing the amplitudes of the (+/–3K/2,0) points to reduce the peak power level, and it should be understood that minor variations in the phase or amplitude of the points are equivalent values contemplated by the present invention.

Please replace claim 8 with the following language for claim 8:

8. The receiver of claim 1, wherein a grouping associated with a first bit of said three-bit symbol decode divides said constellation between a first subgroup including said first, second, fifth and sixth points and a second subgroup comprising all points that are not members of said first subgroup, wherein a grouping associated with a second bit of said three-bit symbol decode divides said constellation between a third subgroup including said first, third, sixth and

UNITED STATES PATENT AND TRADEMARK OFFICE
CERTIFICATE OF CORRECTION

PATENT NO. : 7,254,188 B2
APPLICATION NO. : 10/737323
DATED : August 7, 2007
INVENTOR(S) : Cannon et al.

It is certified that error appears in the above-identified patent and that said Letters Patent is hereby corrected as shown below:

eighth points and a fourth subgroup comprising all points that are not members of said third subgroup, and wherein a grouping associated with a third bit of said three-bit symbol decode divides said constellation between a fifth subgroup including said first, third, fifth and seventh points and a sixth subgroup comprising all points that are not members of said fifth subgroup, and wherein is said log-likelihood.

Signed and Sealed this

Twenty-sixth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,254,188 B2
APPLICATION NO. : 10/737323
DATED              : August 7, 2007
INVENTOR(S)       : Cannon et al.

It is certified that error appears in the above-identified patent and that said Letters Patent is hereby corrected as shown below:

Col. 10; line 64, claim 6, should read as follow:

6. The receiver of claim 5, wherein said first through eighth points of said constellation have complex magnitudes of (K/2,0), (3K/2,0), (-K/2,0), (-3K/2,0), (K/2,K), (K/2,-K), (-K/2,K) and (-K/2,-K), respectively for a particular rotation of said constellation, where K is an arbitrary coefficient for determining an overall amplitude of said constellation.

Signed and Sealed this

First Day of September, 2009

David J. Kappos
*Director of the United States Patent and Trademark Office*